United States Patent
Kicklighter et al.

(10) Patent No.: US 9,867,260 B2
(45) Date of Patent: Jan. 9, 2018

(54) LIGHTING CONTROLLER

(71) Applicant: Savant Systems, LLC, Hyannis, MA (US)

(72) Inventors: Kevin C. Kicklighter, Cottonwood, UT (US); Steven R. McDaniel, Salt Lake City, UT (US); Nichol Fife Draper, West Jordan, UT (US)

(73) Assignee: Savant Systems, LLC, Hyannis, MA (US)

( * ) Notice: Subject to any disclaimer, the term of this patent is extended or adjusted under 35 U.S.C. 154(b) by 446 days.

(21) Appl. No.: 13/927,976

(22) Filed: Jun. 26, 2013

(65) Prior Publication Data

US 2015/0002276 A1  Jan. 1, 2015

(51) Int. Cl.
*H05B 37/02* (2006.01)
*G08C 17/02* (2006.01)

(52) U.S. Cl.
CPC ......... *H05B 37/0272* (2013.01); *G08C 17/02* (2013.01); *H05B 37/0254* (2013.01); *G08C 2201/20* (2013.01); *G08C 2201/93* (2013.01); *Y02B 20/48* (2013.01)

(58) Field of Classification Search
CPC . H05B 37/0272; H05B 37/0254; G08C 17/02
See application file for complete search history.

(56) References Cited

U.S. PATENT DOCUMENTS

| | | | | |
|---|---|---|---|---|
| 4,521,843 A | * | 6/1985 | Pezzolo | H02M 5/2576 307/41 |
| 5,402,121 A | * | 3/1995 | Noorbehesht | H03M 11/20 341/22 |
| 5,450,079 A | * | 9/1995 | Dunaway | H04B 1/202 341/23 |
| 6,901,439 B1 | * | 5/2005 | Bonasia | H04L 12/2809 709/220 |
| 7,394,367 B1 | * | 7/2008 | Aupperle | G05B 15/02 340/530 |

(Continued)

FOREIGN PATENT DOCUMENTS

WO   WO-2014/204689 A1   12/2014

OTHER PUBLICATIONS

"Notification of Transmittal of the International Search Report and the Written Opinion of the International Searching Authority, or the Declaration", PCT Application No. PCT/US2014/042470, issued by the European Patent Office, dated Sep. 19, 2014, 13 pages.

(Continued)

*Primary Examiner* — Kenneth M Lo
*Assistant Examiner* — David Wynne
(74) *Attorney, Agent, or Firm* — Cesari and McKenna, LLP; James A. Blanchette

(57) ABSTRACT

An automation system includes a lighting controller having a WiFi interface through which wireless communication may be established with one or more mobile devices such as smartphones, tablets and the like. Using a mobile device, an installer may rapidly and reliably configure the lighting controller including creating or modifying bindings and settings for keypads which are associated with the lighting controller. The lighting controller includes a dynamic snubber circuit which automatically adjusts itself to operate with different types of loads.

16 Claims, 7 Drawing Sheets

(56) References Cited

U.S. PATENT DOCUMENTS

| | | | |
|---|---|---|---|
| 8,289,137 B1 | 10/2012 | Labuda | |
| 8,290,437 B2 * | 10/2012 | Simons | G01S 5/0289 |
| | | | 342/458 |
| 8,405,663 B2 * | 3/2013 | Wikkerink | G04G 9/00 |
| | | | 345/473 |
| 8,417,358 B2 * | 4/2013 | Prummel | G08C 19/28 |
| | | | 340/3.5 |
| 9,119,240 B2 | 8/2015 | Nagazoe | |
| 2003/0020595 A1 * | 1/2003 | Wacyk | H04L 29/12264 |
| | | | 340/3.5 |
| 2005/0131554 A1 * | 6/2005 | Bamberger | E06B 9/32 |
| | | | 700/19 |
| 2006/0009861 A1 * | 1/2006 | Bonasia | H04L 12/2809 |
| | | | 700/18 |
| 2006/0074494 A1 * | 4/2006 | McFarland | G05B 15/02 |
| | | | 700/1 |
| 2008/0316730 A1 * | 12/2008 | Diederiks | G06F 3/0481 |
| | | | 362/85 |
| 2010/0114340 A1 * | 5/2010 | Huizenga | H05B 37/0272 |
| | | | 700/90 |
| 2011/0050451 A1 * | 3/2011 | Mierta | G08C 17/02 |
| | | | 340/12.22 |
| 2012/0242526 A1 * | 9/2012 | Perez | G08C 17/02 |
| | | | 341/176 |
| 2013/0010018 A1 | 1/2013 | Economy | |
| 2013/0026947 A1 * | 1/2013 | Economy | H05B 37/0272 |
| | | | 315/287 |
| 2013/0030589 A1 * | 1/2013 | Pessina | H05B 37/0272 |
| | | | 700/295 |
| 2013/0033197 A1 * | 2/2013 | Hwang | H05B 33/0815 |
| | | | 315/307 |
| 2013/0154820 A1 * | 6/2013 | Miller | B60Q 1/2611 |
| | | | 340/471 |

OTHER PUBLICATIONS

RADIORA2: Lutron Home Control+ App for the Apple® iPad™, iPhone™ and iPod® touch, Lutron Home Control + App, Lutron Technical Support, Lutron Electronics Co., Inc., Revision F, 2010, Retrieved from <URL:http://www.hillresi.com/PDFS/RA%202%20iPad%20iPhone%20iPod%20touch%20App%20guide%20-%20revF.pdf>, Retrieved on Jul. 27, 2017, pp. 1-29.

* cited by examiner

LIGHTING CONTROLLER

BACKGROUND

Technical Field

The present disclosure relates generally to home automation systems and more specifically to a lighting controller.

Background Information

Automation systems are becoming increasingly popular in both residential and commercial buildings. In a typical home automation system, one or more controllers organize the system. The controllers operate under directions from a user, received on user interface devices in communication with the controllers. The controllers may control endpoints that implement functions to change the environment, and in some cases collect environmental data. Depending on the type of home automation system, the nature of the controllers, user interface devices, and endpoints may vary. Further, the same device may sometimes operate as both a controller, a user interface device, and/or an endpoint, depending on its capabilities and current role. As used herein, the term "component" should be understood to refer generally to controllers, user interface devices, and/or endpoints of a home automation system.

An automation system may include components related to any of a variety of different types of functions in the areas of lighting, climate control, audio/video, window shades and drapes, security and surveillance, communications, entry control, power management, and the like. For example, if the automation system supports lighting control, controllers may include a lighting controller, user interface devices may include one or more remote controls and keypads, and endpoints may include load modules. Likewise, if the automation system supports climate control, the controllers may include one or more heating ventilation and air conditioning (HVAC) controllers (or HVAC control functionality integrated into general purpose controllers), the user interface devices may include one or more remote controls, and the endpoints may include one or more thermostats, sensors, and the like.

In order to configure an automation system, each component must generally be identified and its relationship(s) with other components defined. For example, with respect to lighting control, each keypad must be identified and assigned to a particular lighting controller such that individual lamps or scenes may be controlled in accordance with a lighting designer's specification and an end user's preferences. Accordingly there is a need for an improved, more convenient, rapid and reliable way for installers to install and configure lighting components as part of automation systems.

Another challenge that often arises in connection with lighting components and automation systems relates to protection of switches during transitions from the on state to the off state and vice versa. During such transitions, switches may experience overvoltage or excessively rapid changes in current or voltage with respect to time any of which may damage or destroy a switch. Solid state switches are particularly susceptible to this problem. One conventional solution to this problem is a "snubber" circuit which is used to suppress harmful transients. For example, if a switch is connected to an inductive load (e.g., a motor), a snubber circuit consisting of a resistor and capacitor in series may be connected across the load.

A significant disadvantage of a conventional snubber circuit is that it is specifically matched to a type of load (e.g., inductive, capacitive or resistive) and is therefore not appropriate for other types of loads. This is problematic in automation systems in which a variety of types of loads are often present, thus necessitating multiple types of associated snubber circuits.

SUMMARY

In one embodiment, an automation system includes a lighting controller having a WiFi interface through which wireless communication may be established with one or more mobile devices such as smartphones, tablets and the like. Using a mobile device, an installer may rapidly and reliably configure the lighting controller including creating or modifying bindings and settings for keypads which are associated with the lighting controller.

In another embodiment, the lighting controller includes a dynamic snubber circuit which automatically adjusts itself within a dimming cycle to operate with different types of loads. The circuit senses characteristics of a load and determines whether the load is essentially inductive, capacitive or resistive. Based on that determination, the circuit dynamically adjusts itself to appropriately match its characteristics with the load. Such adjustments may be advantageously carried out when the lighting controller performs a dimming operation. The circuit enables the lighting controller to perform smooth dimming operations even with very low power loads such as light emitting diodes (LEDs) and compact fluorescent lamps (CFLs).

It should be understood that a variety of additional features and alternative embodiments may be implemented. This Summary is intended simply as an introduction to the reader, and does not indicate or imply that the examples mentioned herein cover all aspects of the invention, or are necessary or essential aspects of the invention.

BRIEF DESCRIPTION OF THE DRAWINGS

The description below refers to the accompanying drawings, of which.

DETAILED DESCRIPTION

Figure 1:
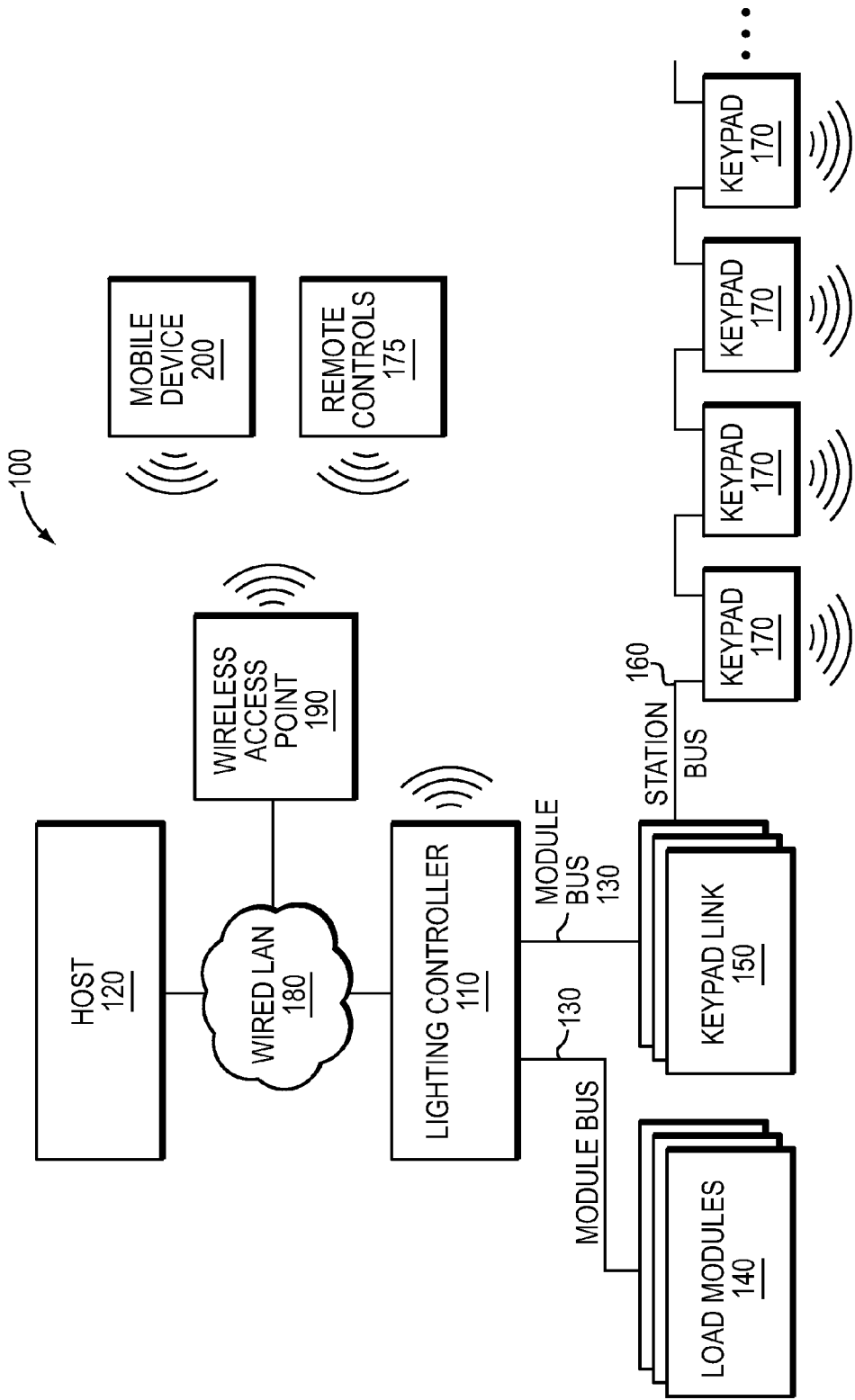
FIG. 1 is a block diagram of an architecture of an automation system which includes a lighting controller.

FIG. 1 is a block diagram of an architecture of an example home automation system 100 that focuses on lighting control. The focus on lighting control is merely illustrative, and it should be understood that a home automation system may support a variety of different types of functions relating to lighting, climate control, audio/video, window shades and drapes, security and surveillance, communications, entry control, power management, and the like. A home automation system may be devoted to one of these functions, or a combination of multiple ones of these functions. A home automation system may be deployed in a residential home and the functions adapted to a residential environment. Alternatively, a home automation system may be deployed in a commercial building (such as an office building, store, factory, etc.) and these functions adapted to commercial requirements.

The example home automation system 100 includes a number of home automation components (e.g., controllers, a user interfaces, and endpoints) related to lighting control. As shown in FIG. 1, a lighting controller 110 is connected via a wired local area network (LAN) 180 to a host controller 120. However, lighting controller 110, as described in detail below, preferably has sufficient onboard resources to operate on a standalone basis without a host controller. Such flexibility advantageously enables lighting controller 110 to be deployed in a wide variety of home automation or other environments at reduced cost and installation time, but without sacrificing desired features or functionality.

The user interfaces include keypads 170, remote controls 175, and potentially mobile devices 200. The endpoint units include load modules, lamp modules (not shown), and the like.

The lighting controller 110 provides control and communication functionality, and supports, via a module bus 130, the load modules 140. The load modules include dimmer modules and relay modules that dim and/or switch individual lighting devices, when directed to do so by the lighting controller 110. Further, the lighting controller 110 supports, via a module bus 130, keypad link units 150 that are coupled, via a respective station bus 160, to keypads 170. The keypads 170 receive user input indicating lighting devices to dim and/or switch, which is provided back to the lighting controller 110. In one embodiment, lighting controller 110 is capable of supporting up to two hundred (200) keypads 170.

If lighting controller 110 is not configured to operate on a standalone basis, host controller 120 is configured to control and monitor operations of lighting controller 110, as well as to provide user interface interpretation and high-level control functions. One or more wireless access points 190 are coupled to wired LAN 180, and support a wireless LAN (WLAN), or more specifically, a WiFi network. As used herein the term "WiFi" refers to a wireless local area network (WLAN) that is based on one or more of the Institute of Electrical and Electronics Engineers' (IEEE) 802.11 standards.

The WiFi network is utilized by remote controls 175, and mobile devices 200. In addition to the remote controls 175 and mobile devices 200, one or more other components of the home automation system 100 may utilize the WiFi network. For example, lighting controller 110, keypads 170 and other components may be WiFi enabled, and use the WiFi network to supplement, or (alternatively) in place of, wired connections.

In addition to receiving user input to control ongoing operation of a home automation system 100, mobile devices 200 may be used to configure components of the home automation system 100. Each individual mobile device 200 may be used in one or both of these roles. As used herein, the term "mobile device" refers to an electronic device that is adapted to be transported on one's person and includes a wireless communication interface and a touch sensitive display screen. Devices such as tablet computers (e.g., the iPad® tablet available from Apple Inc.), smartphones (e.g., the iPhone® smartphones available from Apple Inc., and Android® smartphones available from various suppliers), and certain portable media players (e.g., such as the iPod® touch available from Apple Inc.), are considered mobile devices. A desktop computer would not be considered a mobile device. When used in a control role, a mobile device 200 may execute a control application (app) and communicate with the host controller 120. As described in detail below, when used in a configuration role, a mobile device 200 may execute a configuration app and communicate directly with individual non-controller components.

Figure 2:
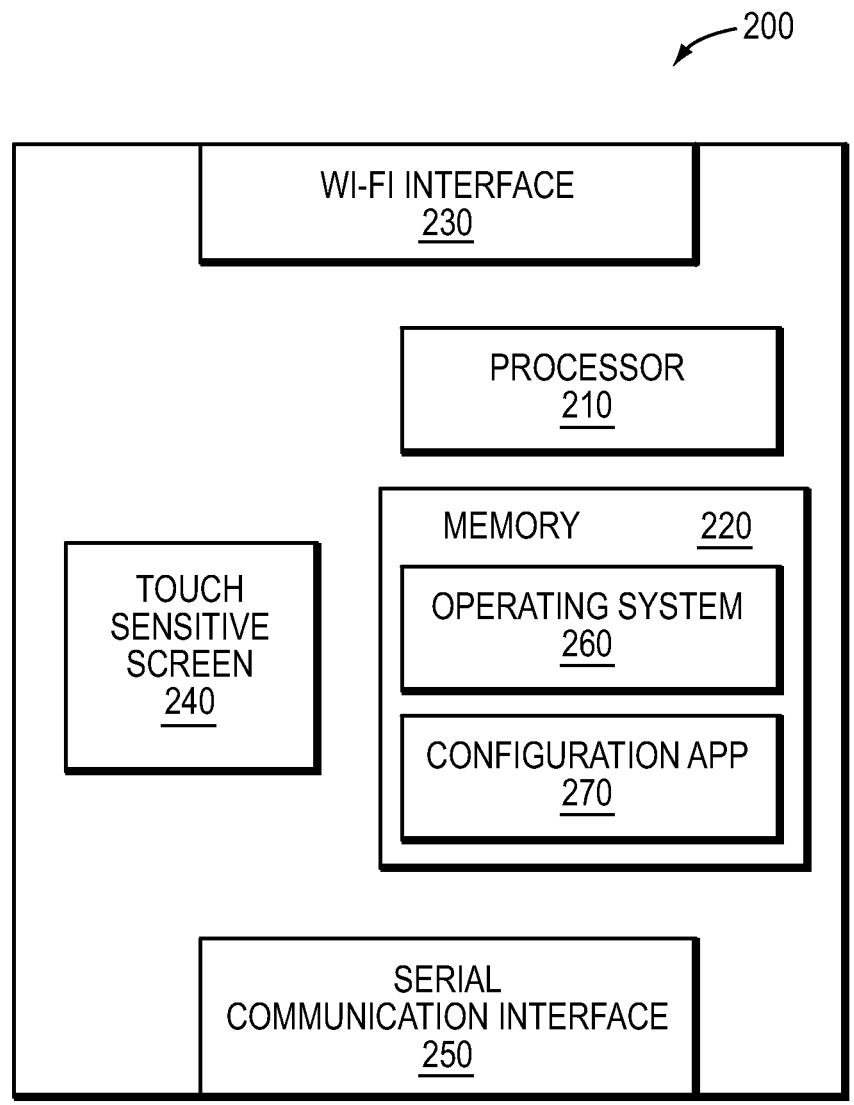
FIG. 2 is a block diagram of an example mobile device.

FIG. 2 is a block diagram of an example mobile device 200. The mobile device 200 includes a processor 210, a memory 220, a wireless network interface 230, a touch-sensitive screen 240, a wired serial communication interface 250, as well as other hardware. The processor 210 includes logic configured to execute software and manipulate data from data structures. The memory 220 includes a plurality of storage locations for storing the software and the data structures. The wireless network interface 230 facilitates communication over a WLAN, or more specifically a WiFi network. The touch-sensitive display screen 240 may receive user input in the form of gestures (e.g., touches, swipes, multi-touch gestures, etc.) from a user. The serial communication interface 250 may be a 30-pin dock interface, a Lightning interface, a USB interface, or another type of interface.

An operating system 260, portions of which are resident in memory 220, functionally organizes the mobile device 200. The operating system 260 may be an iOS® operating system available from Apple Inc., an Android® operating system available from Google, Inc., or another type of operating system. A configuration app 270 is executed in conjunction with the operating system 260, to permit the mobile device 200 to operate in a configuration role, to configure a component (e.g., a controller, a user interface, or an endpoint) of the home automation system 100. The configuration app 270 may display a user interface on the touch sensitive screen 270, and receive user input thereon. In addition, a control app (not shown) may also be stored in the memory 220 to permit the mobile device 200 to operate in a control role and control ongoing operation of the home automation system 100. The control app (not shown) may also display its user interface on the touch sensitive screen 270, and receive user input thereon.

Figure 3:
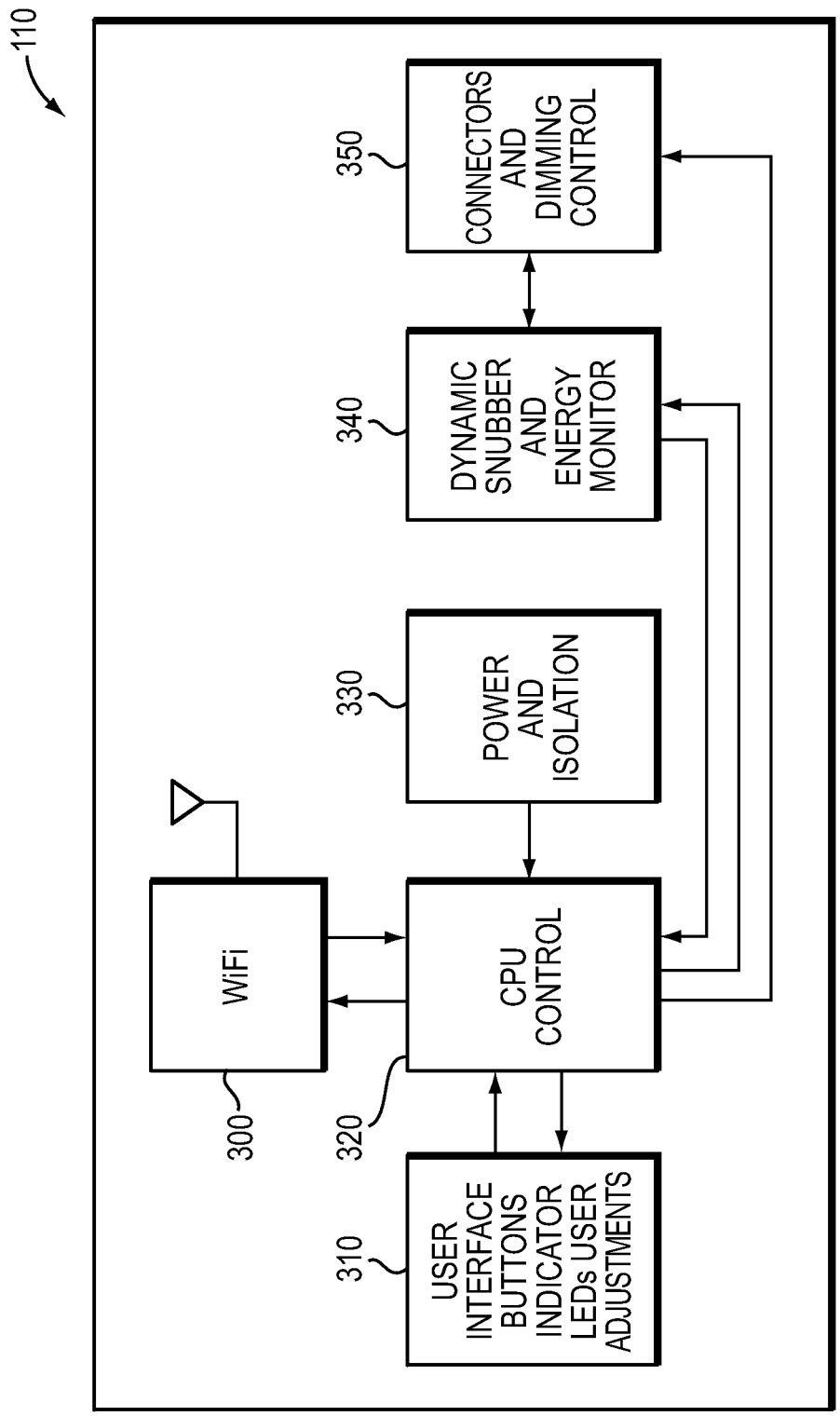
FIG. 3 is a hardware block diagram of an example lighting controller.

FIG. 3 is a hardware block diagram of lighting controller 110 shown in FIG. 1. A WiFi module 300 provides WiFi connectivity for the lighting controller. WiFi module 300 communicates bidirectionally with a CPU/control module 320. WiFi module 300, in conjunction with CPU/control module 320, enables lighting controller 110 to function as either an access point or a client. In addition, if multiple lighting controllers 110 are present in an installation and each is configured as a client, all of the lighting controllers may operate on the same WiFi network. Alternatively, each lighting controller 110 may be configured to provide a separate network which may be advantageous for commercial installations such as conference room centers.

The WiFi connectivity provided by WiFi module 300 enables lighting controller 110 to access hosted web services. Such services may include lookups of detailed information regarding components that are intended to be controlled by or to interoperate with lighting controller 110. In addition, the WiFi connectivity provided by WiFi module 300 enables lighting controller 110 to be remotely controlled via the web.

A user interface module 310 is preferably a keypad which may include buttons, indicator LEDs, and other user-adjustable controls. User interface module 310 communicates bidirectionally with CPU/control module 320. A power and isolation module 330 provides power to CPU/control module 320. A dynamic snubber and energy monitor module 340 communicates bidirectionally with CPU/control module 320. Module 340 communicates bidirectionally with a connectors/dimming control module 350, which also receives communication from CPU/control module 320.

Figure 4:
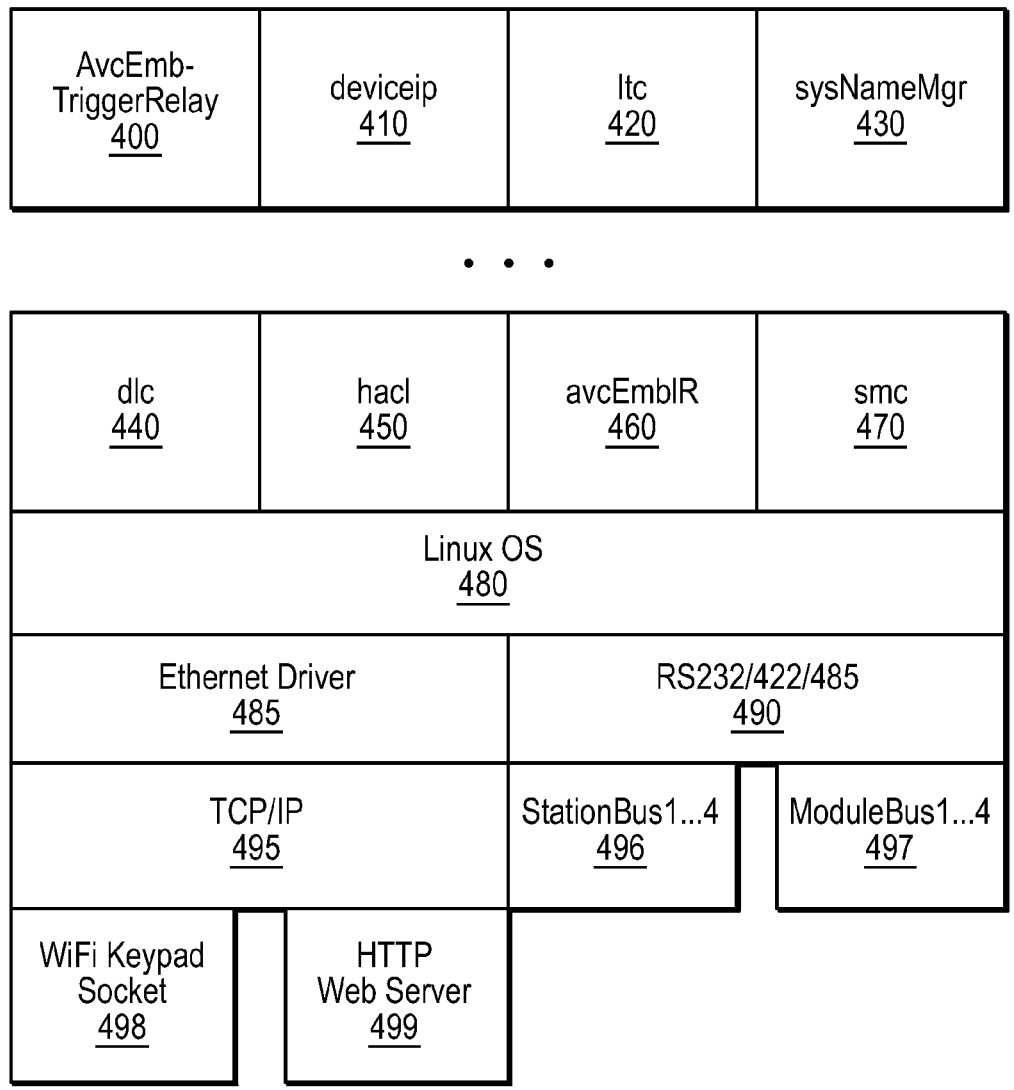
FIG. 4 is a software block diagram of an example lighting controller.

FIG. 4 is a software block diagram of lighting controller 110 shown in FIG. 1. A process 400 is responsible for trigger/relay management and provides an interface to trigger and relay hardware (not shown). A service 410 is a network settings and discovery service. Service 410 enables a computer connected to the same network as lighting controller 110 to find the lighting controller and set its IP address, network submask, gateway, DNS server settings as well as DHCP or static entries. A service 420 is a lighting controller service which receives information regarding lighting events, runs lighting scripts and keeps track of load states, scene states and LED indicators. A service 430 is responsible for obtaining and maintaining a system name.

A controller 440 is a device link controller which provides read, write and bridge access to inter-integrated circuit (I2C) and serial peripheral bus (SPI) devices. An interface 450 provides an abstracted interface to the lower level control hardware and software, and enables other apps to control lighting controller 110 for functions such as audio/video switching and shelf management. A service 460 provides an interface for infrared (IR) devices. A controller 470 is responsible for temperature monitoring and fan speed.

A Linux operating system 480 functionally organizes lighting controller 110. An Ethernet driver 490, in conjunction with a TCP/IP protocol stack 495, a WiFi keypad socket 498 and a HTTP web server 499, provide network connectivity for lighting controller 110. A group of drivers 490, in conjunction with an interface 496, provide communication with keypads 170 (FIG. 1) via station bus 160 (FIG. 1). Similarly, drivers 490, in conjunction with an interface 497, provide communication with load modules 140 (FIG. 1) via module bus 130 (FIG. 1).

As described above, by virtue of its substantial onboard resources, lighting controller 110 may be configured to operate on a standalone basis without a host controller or, alternatively, in conjunction with a host controller (FIG. 1). In either configuration, lighting controller 110 provides a rich variety of functions and features. For example, a button on user interface 310 (keypad) of lighting controller 110 may be assigned to turn on and off a desired lighting "scene" which consists of multiple lamps in a room or zone each of which is set to a preselected illumination level. A simple example of a lighting scene is an "all on" scene in which all of the exterior lights of a home are on at maximum illumination. Another example is an "all off" scene in which all of the interior lamps in a home are turned off. Yet another example is a "movie night" scene in which a family room or media room is darkened for viewing a TV or screen, but dim peripheral lighting is provided by a table lamp or wall sconce. Other scenes may be created in which individual lamps are on but dimmed to desired illumination levels in accordance with a lighting designer's specification or an end user's preferences.

As an alternative to user interface (keypad) 310 of lighting controller 110, mobile device 200 may function as a user interface to lighting controller 110. By making appropriate gestures with respect to buttons or other controls displayed on touch sensitive screen 240, a user may turn on or off lighting scenes or otherwise operate lighting controller 110.

Figure 5:
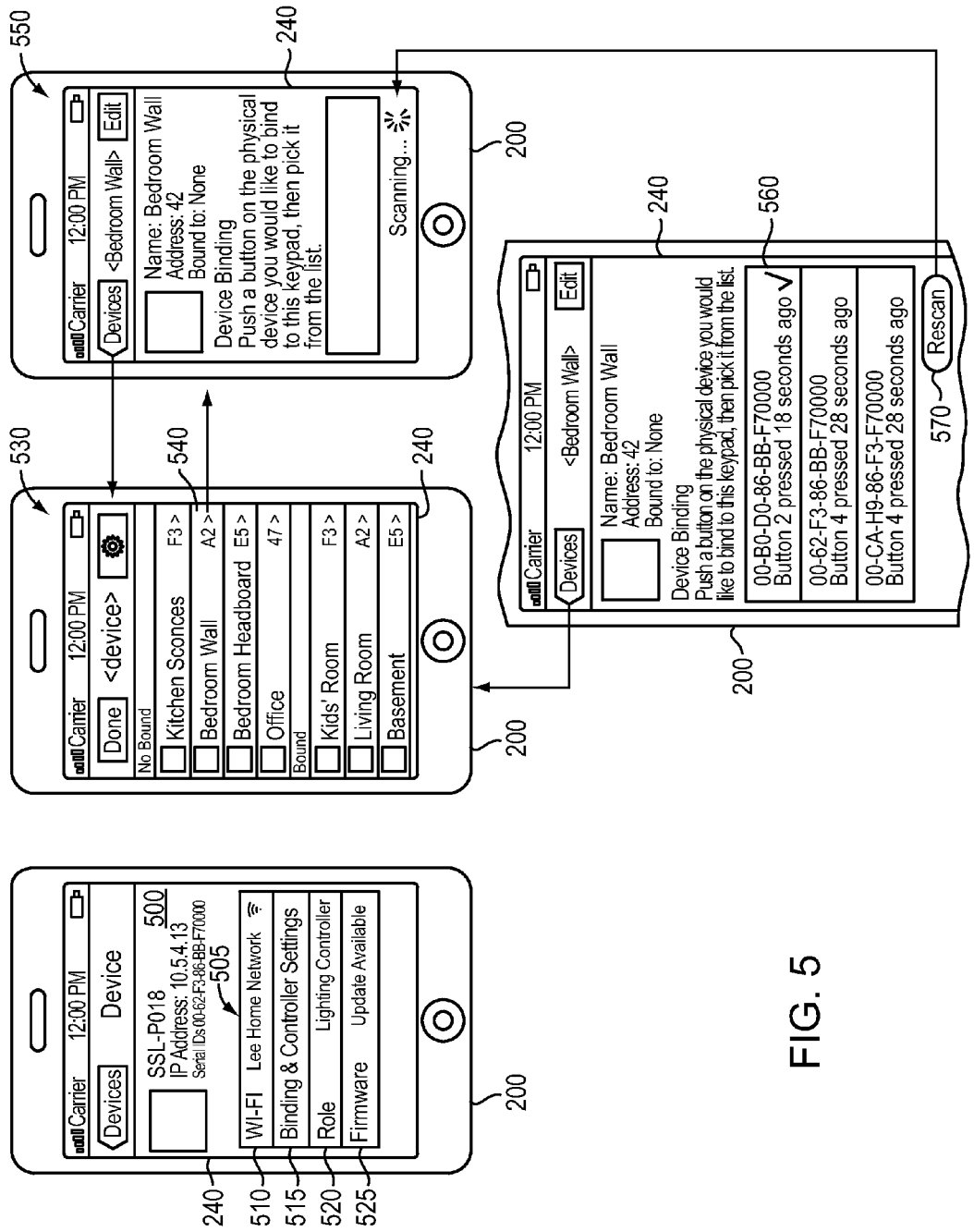
FIG. 5 is a series of views of an example mobile device as it may be used by an installer to create or modify bindings between the lighting controller and keypads.

With reference now to FIGS. 1, 2 and 5, a method for creating or modifying bindings and settings for keypads 170 which are associated with lighting controller 110 is described. As discussed above, when used in a configuration role or mode, mobile device 200 may execute a configuration app and communicate directly with individual non-controller components including lighting controller 110 and keypads 170. As shown in FIG. 5, mobile device 200 has previously downloaded and is executing a configuration app. Touch sensitive screen 240 is displaying information 500 regarding a "Device", i.e., a lighting controller, which may represent lighting controller 110, identified by a model designation "SSL-P018." Beneath the model designation, an IP address (10.5.4.13) assigned to lighting controller 110 is displayed along with a unique system identifier (00-82-F3-86-BB-F7000). Beneath the unique system identifier, screen 240 displays a series of buttons 505.

A first button 510 is labeled with the name of a WiFi network, "Lee Home Network", with which lighting controller 110 is currently associated. By pressing button 510, an installer or end user may obtain information regarding other available WiFi networks that are alternatives to the "Lee Home Network" WiFi network.

A second button 515 is labeled "Binding & Controller Settings" and is typically used by an installer to create or modify bindings and settings for keypads 170. A third button 520 is labeled "Role" and displays the role ("Lighting Controller") of the lighting controller whose information is currently displayed on screen 240. A fourth button 525 labeled "Firmware" displays an indication whether a firmware update is available for lighting controller 110. As described above, firmware updates may be obtained using a hosted web service and the WiFi connectivity in lighting controller 110.

When an installer wishes to create or modify bindings or settings for keypads 170, he or she begins by pressing button 515 which causes screen 240 to transition to a display 530 in which buttons corresponding to unbound keypads (e.g., "Kitchen Sconces") are listed first followed by buttons corresponding to bound keypads (e.g., "Kids' Room"). In order for a given lighting controller to interoperate with a keypad, the keypad must be bound to the lighting controller. To create a binding for an unbound keypad, an installer presses the button for the corresponding location. For example, by pressing a button 540 labeled "Bedroom Wall" screen 240 transitions to a display 550 which corresponds to a bedroom wall location.

Display 550 shows that the "Bedroom Wall" keypad has an address assigned to it but is currently not bound to any device. Next, an installer physically presses a key on the "Bedroom Wall" keypad which causes that keypad to transmit a WiFi signal for which mobile device 200 is scanning. For each such signal that mobile device 200 detects during its scan, mobile device displays a button 560 which is labeled with a unique system identifier of the detected keypad as well as an indication of which physical button was pressed and the elapsed time since the press occurred. If the desired keypad is not displayed, an installer physically presses a button on the keypad and then presses a "Rescan" button 570 on screen 240, which under normal operation causes a new button similar to button 560 to appear on the screen.

To create a binding for a particular keypad, an installer simply presses the button 560 corresponding the desired keypad, which results in the display of a check mark that serves as a visual confirmation to the installer of the selection that was made. At this point, the selected keypad is now bound to the lighting controller. Information regarding bindings is preferably stored on lighting controller 110.

Figure 6:
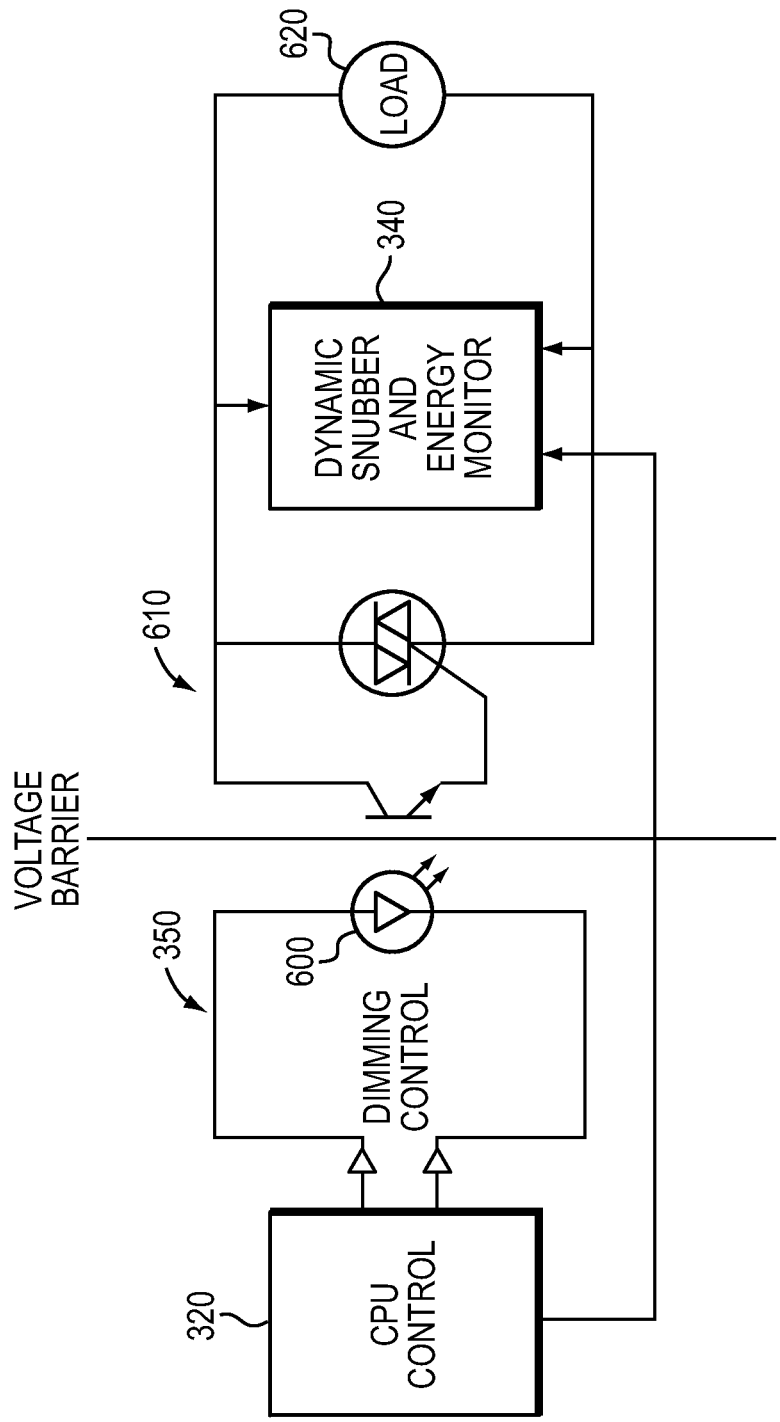
FIG. 6 is a block diagram of a dynamic snubber circuit which is a part of the lighting controller.

FIG. 6 is a hardware block of the dynamic snubber circuit shown in FIG. 3. CPU/control module 320 is coupled to dimming control module 350 which includes an LED 600. A snubber circuit 610 is connected in parallel with dynamic snubber and energy monitor module 340 as well as a load 620. During a dimming cycle, the presence of light emitted from LED 600 causes snubber circuit 610 to be connected across load 620. When the dimming cycle ends, no light is emitted by LED 600 and snubber circuit 610 is effectively isolated from load 620.

Figure 7:
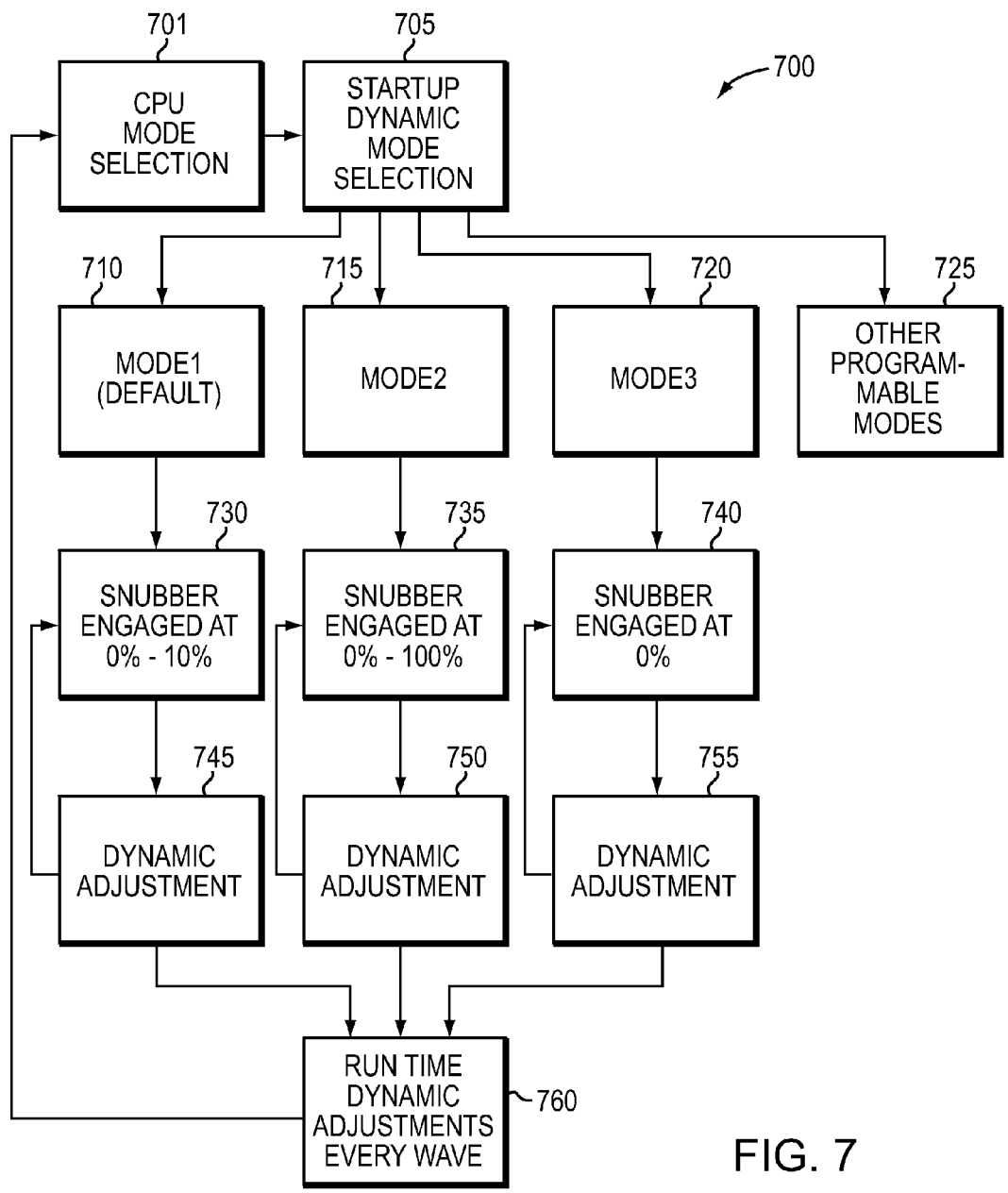
FIG. 7 is a flowchart illustrating the operation of the dynamic snubber circuit.

FIG. 7 is a flowchart 700 showing the operation of the dynamic snubber and energy monitor module 340. With reference now to FIGS. 6 and 7, at step 701, CPU/control module 320 initiates a selection process. More specifically, at step 705, a dynamic selection is made in which one of a group of programmable operating modes is chosen based on the type of load (e.g., inductive, capacitive or resistive) that is specified. The type of load may be specified in a variety of ways including by a user-selectable option displayed on mobile device 200, by manually pressing a button on (keypad) user interface module 310 or through the software running on lighting controller 110.

Following the selection of an operating mode that is appropriate to the specified type of load, flow advances one of steps 710, 715, 720 or 725. Step 710 corresponds to a first, default operating mode which is appropriate for resistive loads. Step 715 corresponds to a second operating mode which is appropriate, for example, for capacitive loads. Step 720 corresponds to a third operating mode which is appropriate, for example, for inductive loads. As described above, the operating modes are programmable and additional modes may be provided through appropriate programming. Step 725 represents other possible operating modes that may optionally be provided for particular loads having unusual characteristics that are not favorably matched with any of the other available operating modes.

If the first, default operating mode was selected, flow advances to step 730 in which a snubber circuit is dynamically engaged or disengaged at 0%-10% of a wave of a 50 Hz or 60 Hz cycle of line voltage. Similar steps 735 and 740 are provided for the second and third operating modes, respectively, and would typically also be provided for any other programmable modes 725.

At step 745, dynamic adjustment may be made to the snubber circuit engagement or disengagement points, based on the load type and visual observation of the actual performance of the circuit. Again, similar steps 750 and 755 are provided for the second and third operating modes. At step 760, further dynamic adjustments may be made as load 620 is running.

It should be understood that various adaptations and modifications may be made within the spirit and scope of the embodiments discussed herein. Further, it should be understood that at least some portions of the above-described techniques may be implemented in software, in hardware, or a combination thereof. A software implementation may include computer-executable instructions stored in a non-transitory computer-readable medium, such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors, memories, etc. Accordingly, it should be understood that the above descriptions are meant to be taken only by way of example.

The invention claimed is:

1. A method for creating a binding between a keypad and a lighting controller comprising:
executing a configuration application (app) on a mobile device having a touch-sensitive display screen, a user interface of the configuration app being displayed to a user on the touch-sensitive display screen;
displaying, in the user interface, a user-selectable option to create a binding between the lighting controller and the keypad;
in response to selection of the option, displaying, in the user interface, a location that is to have keypad functionality, but that is not currently associated with a physical keypad bound to the lighting controller;
prompting a user to press a key of the keypad to be associated with the displayed location;
detecting a press of at least one key on the keypad;
displaying, in the user interface, a user-selectable entry corresponding to the keypad;
receiving a user selection of the entry; and
in response to the user's press on the keypad and the user selection of the entry, creating a binding between the keypad and the lighting controller by associating the keypad with the displayed location.

2. The method of claim 1, wherein the keypad is WiFi-enabled to communicate with the lighting controller via WiFi signals, and the detecting comprises:
receiving a WiFi signal from the keypad indicating a press of the at least one key.

3. The method of claim 1, further comprising:
displaying, in the user interface, settings of the lighting controller, the settings including a WiFi network associated with the lighting controller.

4. The method of claim 3, further comprising:
scanning the WiFi network for WiFi signals from the keypad indicating the press of the at least one key.

5. The method of claim 1, wherein the displaying a user-selectable entry comprises:
displaying a unique identifier of the keypad.

6. The method of claim 1, wherein the displaying a user-selectable entry comprises:
displaying an indication of the at least one key that was pressed.

7. The method of claim 1, wherein the displaying a user-selectable entry comprises:
displaying an indication of a time elapsed since the at least one key was pressed.

8. The method of claim 1, wherein the mobile device is a smartphone or a tablet computer.

9. A system comprising:
a plurality of WiFi-enabled keypads having keys to receive user input related to lighting functions;
a lighting controller having a WiFi module configured to control lighting devices based on user input received on the keys of the plurality of WiFi-enabled keypads, the lighting controller configured to wirelessly communicate with the plurality of WiFi-enabled keypads via a WiFi network; and
a configuration application (app) that when executed is operable to:
display a location that is to have keypad functionality, but that is not currently associated with a physical keypad, prompt a user to press a key of a keypad of the plurality of WiFi-enabled keypads to be associated with the displayed location,
scan the WiFi network for WiFi signals from any keypads indicating the press of a key,
receive a WiFi signal from the keypad of the plurality of WiFi-enabled keypads indicating the user has pressed the key on the keypad, and
in response to the user's press on the keypad, bind the keypad to the lighting controller by associating the keypad with the displayed location.

10. The system of claim 9, wherein the configuration app when executed is further operable to receive a selection of the displayed location from a user in a user interface of the control application.

11. The system of claim 10, wherein the configuration app when executed is further operable to display elements representing bound and unbound locations in the user interface, and the displayed location is an unbound location that has been selected by the user.

12. The system of claim 9, wherein the configuration app when executed is operable to:
display, in a user interface of the configuration app, a user-selectable entry corresponding to the keypad, and
receive a user selection of the entry,
wherein the keypad is bound in response to the user selection of the entry.

13. The system of claim 12, wherein the entry includes a unique identifier of the at least one keypad.

14. The system of claim 12, wherein the entry includes an indication of the at least one key that was pressed.

15. The system of claim 12, wherein the entry includes an indication of a time elapsed since the at least one key was pressed.

16. The system of claim 9, further comprising:
a mobile device configured to execute the configuration app and display a user interface of the configuration app on the touch sensitive screen, the mobile device separate from the plurality of keypads and the lighting controller.

* * * * *